(12) United States Patent
Patel et al.

(10) Patent No.: US 10,977,687 B2
(45) Date of Patent: Apr. 13, 2021

(54) DATA COLLECTION AND PATTERN ANALYSIS IN A DECENTRALIZED NETWORK

(71) Applicant: MICROSOFT TECHNOLOGY LICENSING, LLC, Redmond, WA (US)

(72) Inventors: Ankur Patel, Sammamish, WA (US); Daniel James Buchner, Los Gatos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 134 days.

(21) Appl. No.: 16/154,519

(22) Filed: Oct. 8, 2018

(65) Prior Publication Data
US 2020/0111118 A1 Apr. 9, 2020

(51) Int. Cl.
G06Q 30/00 (2012.01)
G06Q 30/02 (2012.01)
H04L 29/08 (2006.01)

(52) U.S. Cl.
CPC ..... *G06Q 30/0251* (2013.01); *G06Q 30/0242* (2013.01); *H04L 67/26* (2013.01)

(58) Field of Classification Search
None
See application file for complete search history.

(56) References Cited

U.S. PATENT DOCUMENTS

| 2011/0288868 | A1* | 11/2011 | Lloyd | H04M 1/271 704/251 |
| 2012/0095955 | A1* | 4/2012 | Koshy | G06N 5/02 706/55 |
| 2012/0290979 | A1 | 11/2012 | Devecka | |
| 2013/0185767 | A1* | 7/2013 | Tirupachur Comerica | H04L 9/321 726/4 |
| 2014/0040365 | A1 | 2/2014 | Carter et al. | |

(Continued)

FOREIGN PATENT DOCUMENTS

WO 2017079795 A1 5/2017

OTHER PUBLICATIONS

STIC EIC 3600 Search Report for U.S. Appl. No. 16/154,519 dated May 19, 2020 (Year: 2020).*

(Continued)

*Primary Examiner* — Matthew T Sittner
(74) *Attorney, Agent, or Firm* — Workman Nydegger (57) ABSTRACT

Embodiments disclosed herein are related to computing systems, and methods for determining patterns in received data that are indicative of common characteristics of the one or more users of a computing system. Data from first users of the computing system is received. The received data defines information about the first users. The type of the data that is received is determined by the first users. The received data is analyzed to determine one or more patterns in the received data. The one or more patterns are indicative of one or more common characteristics shared by the first users. Information related to the determined one or more patterns is provided to second users. The information includes a DID for each of the f first users that may be used by the second users to communicate with the first users.

20 Claims, 5 Drawing Sheets

(56) References Cited

U.S. PATENT DOCUMENTS

| | | | | |
|---|---|---|---|---|
| 2015/0128240 A1* | 5/2015 | Richards | ............ | H04W 12/0608 |
| | | | | 726/7 |
| 2015/0332029 A1* | 11/2015 | Coxe | ........................ | H04L 63/06 |
| | | | | 726/9 |
| 2017/0091194 A1* | 3/2017 | Spiegel | ................ | G06F 16/2465 |
| 2017/0109759 A1* | 4/2017 | Korb | ..................... | G06Q 30/018 |
| 2018/0225693 A1* | 8/2018 | Postrel | ............... | G06Q 30/0214 |
| 2019/0253254 A1* | 8/2019 | Brownlee | .............. | H04L 9/3242 |
| 2020/0036707 A1* | 1/2020 | Callahan | ................ | H04L 9/3231 |
| 2020/0111118 A1* | 4/2020 | Patel | ..................... | H04L 9/0894 |
| 2020/0274714 A1* | 8/2020 | Suson | ................... | H04L 9/3226 |

OTHER PUBLICATIONS

"International Search Report and Written Opinion Issued in PCT Application No. PCT/US19/044003", dated Sep. 13, 2019, 13 Pages.

\* cited by examiner

Receiving Data From A Plurality Of First Users Of The Computing System, The Data Defining Information About The Plurality Of First Users, Wherein The Plurality Of First Users Determine The Type Of Data That Is Received By The Computing System

520

Analyzing The Received Data To Determine One Or More Patterns In The Received Data, The One Or More Patterns Being Indicative Of One Or More Common Characteristics Shared By The Plurality Of First Users

530

Providing Information Related To The Determined One Or More Patterns To One Or More Second Users, The Information Including A Decentralized Identifier (DID) For Each Of The Plurality Of First Users That May Be Used By The One Or More Second Users To Communicate With The Plurality Of First Users

*FIG. 5*

DATA COLLECTION AND PATTERN ANALYSIS IN A DECENTRALIZED NETWORK

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, and methods for determining patterns in received data that are indicative of common characteristics of the one or more users of a computing system. The computing system and methods are implemented in a decentralized network that implements a distributed ledger that backs one or more decentralized identities (DID) for one or more users of the computing system. Data from first users of the computing system is received. The received data defines information about the first users. The type of the data that is received is determined by the first users. The received data is analyzed to determine one or more patterns in the received data. The one or more patterns are indicative of one or more common characteristics shared by the first users. Information related to the determined one or more patterns is provided to second users. The information includes a DID for each of the f first users that may be used by the second users to communicate with the first users.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein are related to computing systems, and methods for determining patterns in received data that are indicative of common characteristics of the one or more users of a computing system. The computing system and methods are implemented in a decentralized network that implements a distributed ledger that backs one or more decentralized identities (DID) for one or more users of the computing system. Data from first users of the computing system is received. The received data defines information about the first users. The type of the data that is received is determined by the first users. The received data is analyzed to determine one or more patterns in the received data. The one or more patterns are indicative of one or more common characteristics shared by the first users. Information related to the determined one or more patterns is provided to second users. The information includes a DID for each of the f first users that may be used by the second users to communicate with the first users.

The embodiments disclosed herein provide a technical advance over conventional systems which do not utilize a distributed network that uses decentralized identifiers. For example, embodiments disclosed herein allow the computing system to determine patterns in data received from first users that indicate common characteristics of the first users. These common characteristics may be of interest to second users and may be provided to them and then used to facilitate communication between the first and second users. This is a technical advance in that parties that may not have otherwise been aware of each other are now able to communicate with each other. This advantageously provides for enhanced markets and other platforms where the first and second users are able to interact with each other in new ways.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
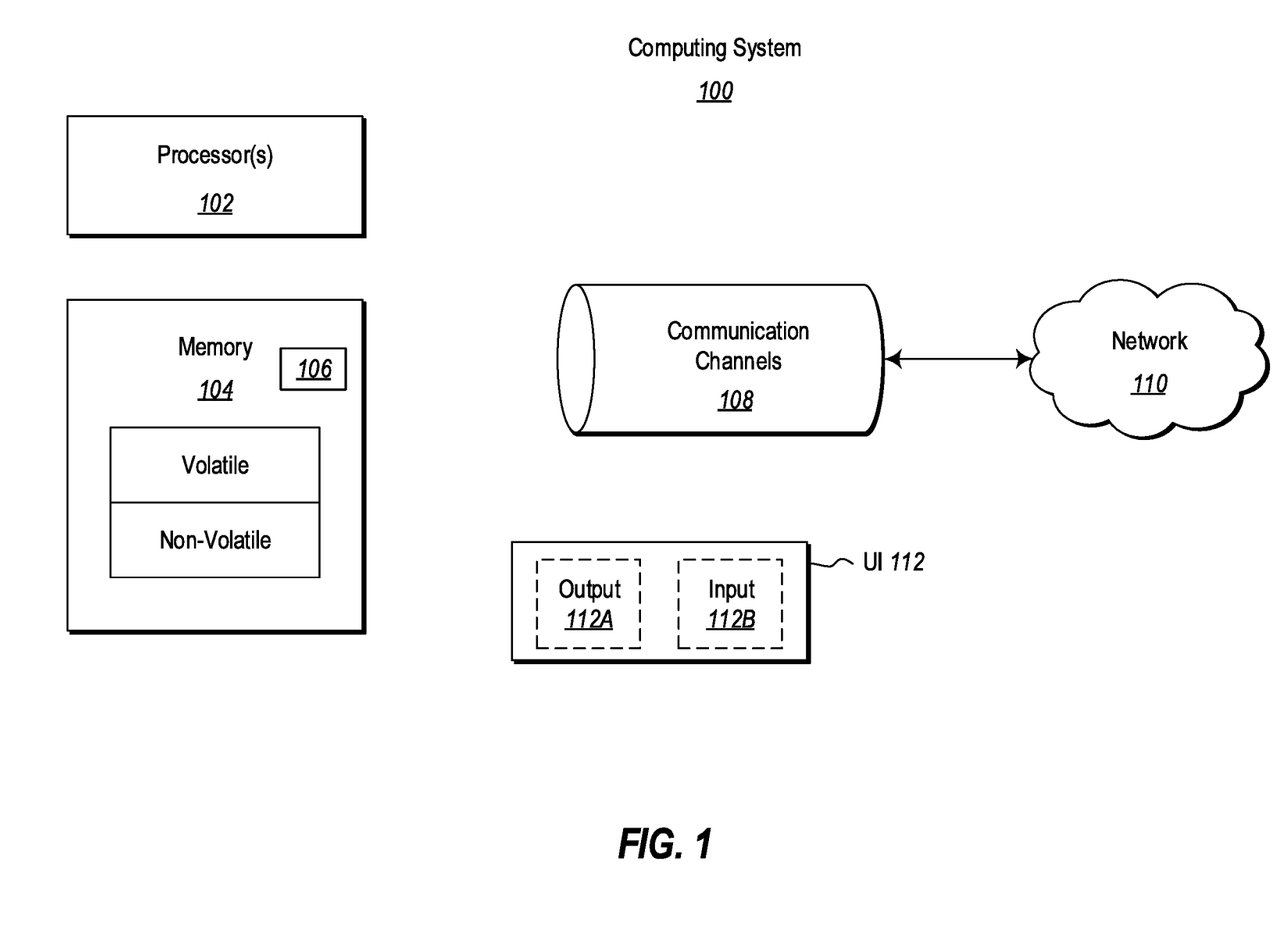
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
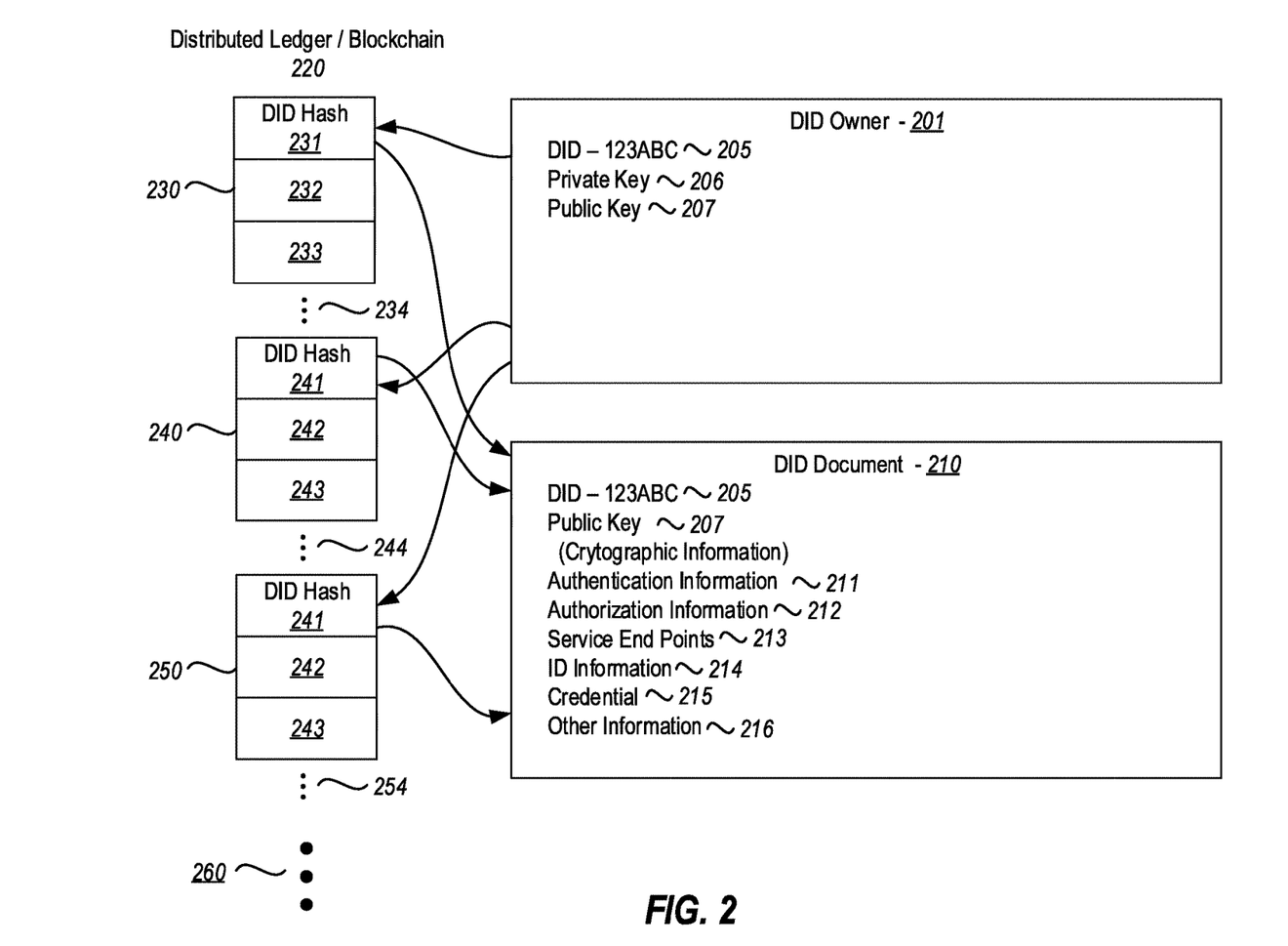
FIG. 2 illustrates an example environment for creating a Decentralized Identification (DID)

Some introductory discussion of a decentralized identification (DID) and the environment is which they are created and reside will now be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource Identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein) Accordingly, the DID 205 may be any identifier that is under the control of the DID owner 201 and independent of any centralized authority.

In some embodiments, the structure of the DID 205 may be as simple as a user name or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. Thus, the private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used by verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child in no longer a minor.

The authorization information 212 may also specify one or more mechanisms that the third party will need to follow to prove they are authorized to modify the DID document 210. In some embodiments, these mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The DID document 210 may further include identification information 214. The identification information 214 may include personally identifiable information such as the name, address, occupation, family members, age, hobbies, interests, or the like DID owner 201. Accordingly, the identification information 214 listed in the DID document 210 may represent a different persona of the DID owner 201 for different purposes. For instance, a persona may be pseudo anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID hash 231, DID hash 241, and DID hash 251, which are ideally identical copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID hash 231, DID hash 241, and DID hash 251 are written to the distributed ledger or blockchain 220. The distributed ledger or blockchain 220 thus records that the DID 205 now exits. Since the distributed ledger or blockchain 220 is decentralized, the DID 205 is not under the control of any entity outside of the DID owner 201. The DID hash 231, DID hash 241, and DID hash 251 may include, in addition to the pointer to the DID document 210, a record or time stamp that specifies when the DID 205 was created. At a later date when modifications are made to the DID document 210, this may also be recorded in DID hash 231, DID hash 241, and DID hash 251. The DID hash 231, DID hash 241, and DID hash 251 may further include a copy of the public key 207 so that the DID 205 is cryptographically bound to the DID document 210.

Figure 3:
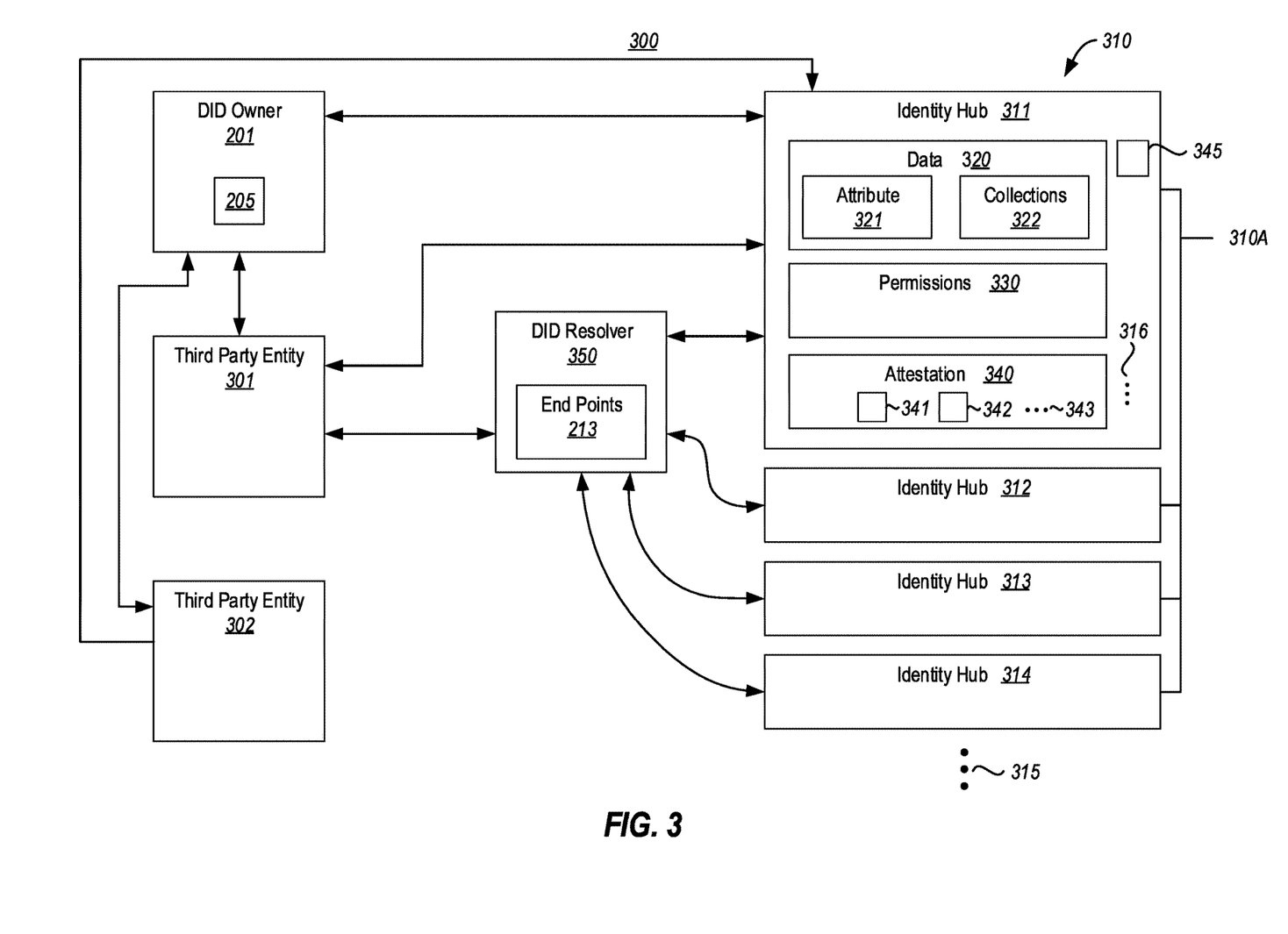
FIG. 3 illustrates an example environment for various DID lifecycle management operations and services.

FIG. 3 illustrates an embodiment of an environment 300 in which a DID such as DID 205 may be utilized. Specifically, the environment 300 will be used to describe the use of the DID 205 in relation to one or more decentralized storage devices or identity hubs. It will be noted that FIG. 3 may include references to elements first discussed in relation to FIG. 2 and thus use the same reference numeral for ease of explanation.

As illustrated in FIG. 3, the environment 300 includes various storage devices or identity hubs 310 that are associated with the DID owner 201. For example, the storage devices or identity hubs 410 may include a first identity hub 311, a second identity hub 312, a third identity hub 313, and a fourth identity hub 314. The ellipses 315 represent that that there may be any number of additional storage devices or identity hubs as circumstances warrant. It will be noted that the identity hubs 310 are considered to be decentralized storage devices in that, as will be explained in more detail to follow, the identity hubs are addressable through use of the DID 205 and its corresponding DID document 210. In addition, although the identity hubs may be hosted by a third party, all access to the identity hubs is based on permissions determined by the DID owner 201.

In one embodiment, the first identity hub 311 may be implemented at a first cloud storage provider, the second identity hub 312 may be implemented at a second cloud storage provider, the third identity hub 313 may be implemented as part of home computing system, and the fourth identity hub 314 may be implemented as part of a mobile device. Thus, the various identity hubs 310 may be implemented across different service providers such as the two different cloud storage providers. Further, the various identity hubs 310 may be implemented as a combination of storage provided by third parties such as the two cloud storage providers and memory devices owned by DID owner 201 such as the home computing system and mobile device. Of course, the various identity hubs 310 may be implemented as other storage devices and services as circumstances warrant.

In one embodiment, the identity hubs 310 may be multiple instances of the same identity hub. This is represented by the line 310A. Thus, the various identity hubs 310 may include at least some of the same data and services. Accordingly, if any change is made to one of the identity hubs 310, the change may be reflected in the remaining identity hubs. For example, the first identity hub 311 and second identity hub 412 are implemented in cloud storage and thus may be able to hold a large amount of data. Accordingly, a full set of the data may be stored in these identity hubs. However, the identity hubs 312 and 313 may have less memory space. Accordingly, in these identity hubs a descriptor of the data stored in the first and second identity hubs may be included. Alternatively, a record of changes made to the data in other identity hubs may be included. Thus, changes in one of the identity hubs 310 are either fully replicated in the other identity hubs or at least a record or descriptor of that data is recorded in the other identity hubs.

Because the identity hubs may be multiple instances of the same identity hub, only a full description of the first identity hub 311 will provided as this description may also apply to the identity hubs 312-315. As illustrated, identity hub 311 may include data storage 320. The data storage 320 may be used to store any type of data that is associated with the DID owner 201. In one embodiment the data may be a collection 322 of a specific type of data corresponding to a specific protocol. For example, the collection 322 may be medical records data that corresponds to a specific protocol for medical data. The collection 322 may be any other type of data.

The data store 320 may also store attribute data 321. The attribute data may include attribute information that describe various interests and likes of the DID owner 201. For example, such attribute information may include favorite foods, favorite sports, favorite hobbies, favorite vacation spots, favorite entertainment, and the like of the DID owner 201. Thus the attribute data 321 about the DID owner 201 may be information provided by the DID owner 201 or it may be information that is gleamed from interactions with a third party.

In some embodiments, the data store may also include telemetry data that includes information about the data usage of the DID owner 201. For example, the telemetry data may include data about which web sites the DID owner 201 visits, how long he or she visits the web sites, and which devices are used access the websites. The telemetry data may also include data about which products the DID owner 201 purchases and where such products are purchased. Accordingly, the telemetry data may be any data about the usage patterns of the DID owner 201.

In some embodiments, the identity hub 311 may have a permissions module 330 that allows the DID owner 201 to set specific authorization or permissions for third parties such as third parties 301 and 302 to access the identity hub. For example, the DID owner 201 may provide access permission to his or her spouse to all the data 320. Alternatively, the DID owner 201 may allow access to his or her doctor for any medical records. It will be appreciated that the DID owner 201 may permission to any number of third parties to access a subset of the data 320. This will be explained in more detail to follow.

For example, a first subset of the data may have a permission that allows the data to be publicly exposed, but that does not include any authentication to the DID owner 201. This type of data may be for relatively unimportant data such as color schemes and the like. A second subset of the data may have a permission that that allows the data to be publicly exposed and that includes authentication to the DID owner 201. A third subset of the data may have a permission that encrypts the subset of data with the private key 206 and public key 207 pair (or some other key pair) associated with the DID owner 201. This type of data will require a party to have access to the public key 207 or to some other associated public key in order to decrypt the data. This process may also include authentication to the DID owner 201. A fourth subset of the data may have a permission that restricts this data to a subset of third parties. This may require that public keys associated with the subset of third parties be used to decrypt the data. For example, the DID owner 201 may cause the permission to specify that only public keys associated with friends of the DID owner 201 may decrypt this data.

In some embodiments, the identity hub 311 may include an attestation store 340 that includes various attestations 341, 342 and any number of additional attestations as illustrated by the ellipses 343 associated with the DID owner 201. An attestation may also be referred to as a credential or verified credential such as the credential 215 of the DID document 210. That is, the attestation or verified credential may provide information about the DID owner 201 and/or about various entities the DID owner 201 has interactions with. As mentioned previously, the attestations 340 may be (but are not limited to) a qualification, an achievement, a government ID, a government right such as a passport or a driver's license, a payment provider or bank account, a university degree or other educational history, employment status and history, or any other information about the DID owner 201's background. Accordingly, the attestations 340 may be used to verify the identity of the DID owner 201.

The identity hub 311 may also have a messaging module 345. In operation, the messaging module allows the identity hub to receive messages such as requests from parties such as third parties 301 and 302 to access the data and services of the identity hub. In addition, the messaging module 345 allows the identity hub 311 to respond to the messages from the third parties and to also communicate with a DID resolver 350. The DID resolver 350 may be a service, application, or module that is configured in operation to search the distributed ledger or blockchain 220 for DID documents associated with DIDs. Accordingly, in the embodiment the DID resolver 350 may search the distributed ledger or blockchain 220 using the DID 205, which may result in the DID resolver 350 finding the DID document 210. The ellipses 316 represent that the identity hub 311 may have additional services as circumstances warrant.

In one example embodiment, the DID owner 201 may provide the DID 205 to the third party entity 301 so that the third party may access data or services stored on the identity hub 311. Once the third party 301 has access to the DID 205, he or she may access the DID resolver 350 to access the DID document 210. As previously discussed, the DID document 210 may include an end point 213 that is an address or pointer to the identity hub 311. The third party 301 may then use the address or pointer to access the identity hub 311.

The third party 301 may send a message to the messaging module 345 asking for permission to access data in the identity hub 311. The messaging module 345 may then send a message to the DID owner 201 asking if the third party 301 should be given access to the data. Because the DID owner 201 desires to provide access to this data, the DID owner 201 may allow permission to the third party 301 and this permission may be recorded in the permissions 330.

The messaging module 345 may then message the third party 301 informing the third party that he or she is able to access the data. The identity hub 311 and the third party 301 may then directly communicate so that the third party may access the data. It will be noted that in many cases, it will actually be an identity hub associated with the third party 301 that communicates with the identity hub 311. However, it may be a device of the third party 301 that does the communication.

Advantageously, the above described process allows the identity hub 311 and the third party 301 to communicate and to share the data without the need for the third party to access the identity hub 311 in the conventional manner. Rather, the communication is provisioned in the decentralized manner using the DID 205 and the DID document 210. This advantageously allows the DID owner to be in full control of the process.

As shown in FIG. 3, the third party 302 may also request permission for access to the identity hub 311 using the DID 205 and the DID document 210. Accordingly, the embodiments disclosed herein allow access to any number of third parties to the identity hubs 310.

Figure 4:
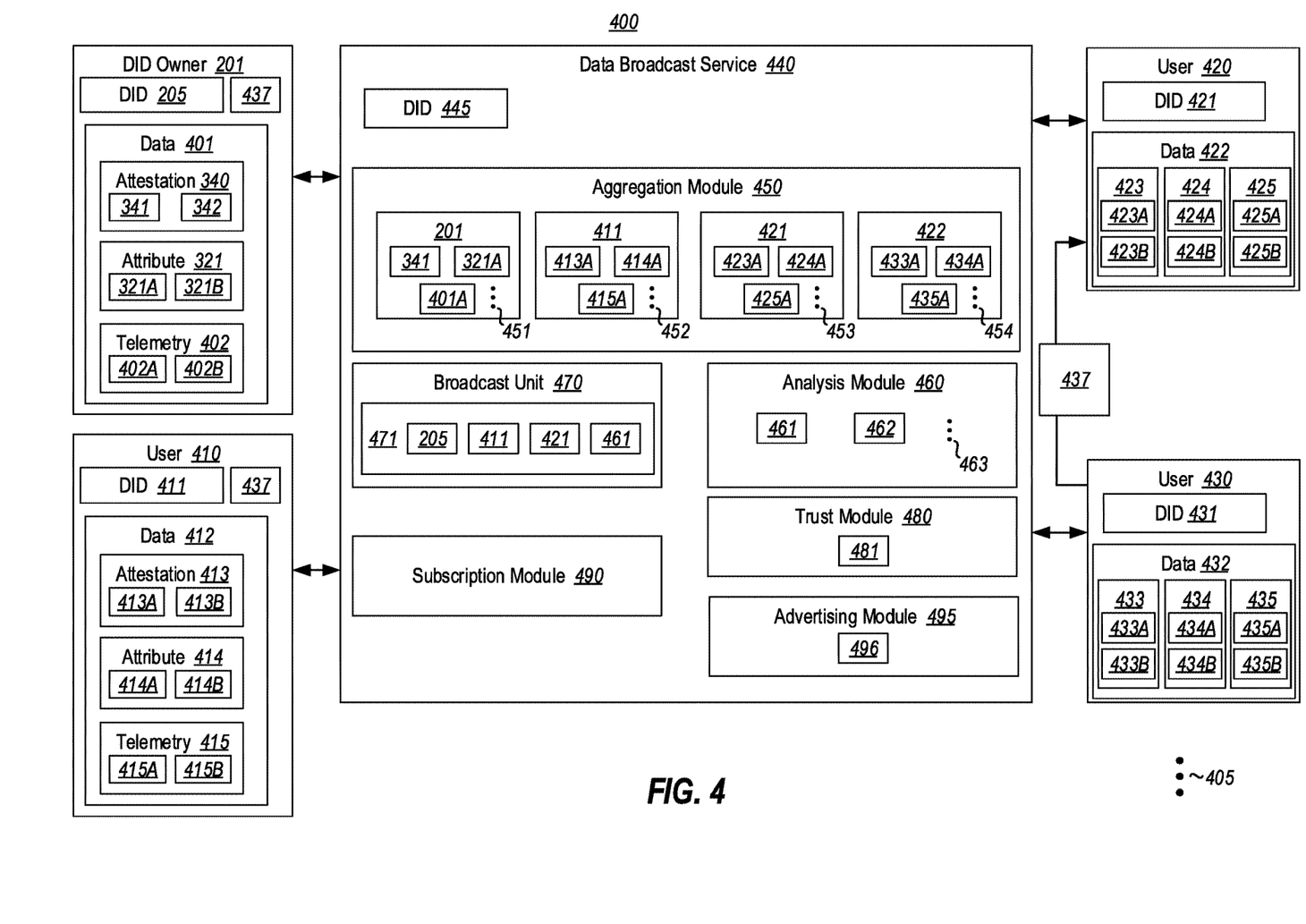
FIG. 4 illustrates an embodiment for determining patterns in received data that are indicative of common characteristics of the one or more users of a computing system.

FIG. 4 illustrates an embodiment of an environment 400 in which a DID such as DID 205 may be utilized. Specifically, the environment 400 will be used to describe the use of the DID 205 in relation to a data broadcast service. It will be noted that FIG. 4 may include references to elements first discussed in relation to FIGS. 2-3 and thus use the same reference numeral for ease of explanation.

As illustrated, the environment 400 includes a user 4010, a user 420, a user 430, and any number of additional users as illustrated by the ellipses 405. As shown in FIG. 4, the user 410 may own or have control of a DID 411, the user 420 may own or have control of a DID 421, and the user 430 may own or have control of a DID 431. It will be noted that the DID 411, the DID 421, and the DID 431 are generated and stored on the distributed ledger or blockchain 220 in the manner previously described for the DID 205. Thus, the users 410, 420, and 430 may also have a DID document associated with their respective DIDs and may also have one or more identity hubs that include attestations that may be used to verify the identity of the users 410, 420, and 430. Accordingly, the DID documents and identity hubs associated with the users 410, 420, and 430 may be similar to the DID document 210 and the identity hubs 310 previously described and thus do not need to be explained in further detail. Although not illustrated, each of the users 405 may also have an associated DID and DID document. It will also be noted that the users 410, 420, and 430 (and the users 405) may be human users or institutional users such businesses or organizations.

As illustrated, the DID owner 201 may control various data 401. The data 401 may be included on the one or more devices used by the DID owner 201 when accessing the decentralized network backed by the distributed ledger or blockchain 220 or it may be included in one of the identity hubs 310 such as the identity hub 311. In some embodiments the data 401 may be included in an alternative location other than the device or the identity hub. As shown, the data 401 may include the attestation data 340 including attestations 341 and 342 previously described. The data 401 may also include attribute data 321 previously described including attribute data 321a and 321b. The data 401 may further include telemetry data 402 including telemetry data 402a and 402b. As described previously, the telemetry data 402 may include any data about the data usage of the DID owner 201. It will be noted that although only two examples of each type of data 401 is shown, this is for ease of explanation only and thus there may be numerous examples of each type of data included.

The user 410 may control various data 412. The data 412 may be included on the one or more devices used by the user 410 when accessing the decentralized network backed by the distributed ledger or blockchain 220 or it may be included in an identity hub associated with the user 410, which may correspond to the identity hubs previously described. In some embodiments the data 412 may be included in an alternative location other than the device or the identity hub. As shown, the data 412 may include the attestation data 413 including attestations 413a and 413b, which may correspond to the attestations 340 previously described. The data 412 may also include attribute data 414 including attribute data 414a and 414b, which may correspond to the attribute data 321 previously described. The data 412 may further include telemetry data 415 including telemetry data 415a and 415b, which may correspond to the telemetry data previously described. It will be noted that although only two examples of each type of data 412 is shown, this is for ease of explanation only and thus there may be numerous examples of each type of data included.

The user 420 may control various data 422. The data 422 may be included on the one or more devices used by the user 420 when accessing the decentralized network backed by the distributed ledger or blockchain 220 or it may be included in an identity hub associated with the user 420, which may correspond to the identity hubs previously described. In some embodiments the data 422 may be included in an alternative location other than the device or the identity hub. As shown, the data 422 may include the attestation data 423 including attestations 423a and 423b, which may correspond to the attestations 340 previously described. The data 422 may also include attribute data 424 including attribute data 424a and 424b, which may correspond to the attribute data 321 previously described. The data 422 may further include telemetry data 425 including telemetry data 425a and 425b, which may correspond to the telemetry data previously described. It will be noted that although only two examples of each type of data 422 is shown, this is for ease of explanation only and thus there may be numerous examples of each type of data included.

The user 430 may control various data 432. The data 432 may be included on the one or more devices used by the user 430 when accessing the decentralized network backed by the distributed ledger or blockchain 220 or it may be included in an identity hub associated with the user 430, which may correspond to the identity hubs previously described. In some embodiments the data 432 may be included in an alternative location other than the device or the identity hub. As shown, the data 432 may include the attestation data 433 including attestations 433a and 433b, which may correspond to the attestations 340 previously described. The data 432 may also include attribute data 434 including attribute data 434a and 434b, which may correspond to the attribute data 321 previously described. The data 432 may further include telemetry data 435 including telemetry data 435a and 435b, which may correspond to the telemetry data previously described. It will be noted that although only two examples of each type of data 432 is shown, this is for ease of explanation only and thus there may be numerous examples of each type of data included. The users 405 may also have control over various attestation data, attribute data, and telemetry data that may correspond to the data previously described.

As also illustrated, the environment 400 includes a data broadcast service 440. In one embodiment, the data broadcast service 440 may be implemented by a third party such as the provider of a DID management service that generates a DID for various parties and/or the provider of the identity hubs 310. In some embodiments, the data broadcast service 440 may be hosted on a server computer that is separate from any devices owned by the DID owner 201 or the users 410, 420, and 430.

As illustrated, the data broadcast service 440 may include a DID 445. The DID 445 may be generated and stored on the distributed ledger or blockchain 220 in the manner previously described for the DID 205. Although not illustrated, the DID 445 may also be associated with a corresponding DID document that defines how to use the DID 445 in a manner similar to the DID document 210. The DID 445 may also have an associated private and public key pair that allow the DID 445 to be used by third parties to access the data broadcast service 440.

It will be noted that since the data broadcast service 440 includes the DID 445, the data broadcast service 440 is able to interact with the DID owner 201 and the users 410, 420, and 430 in a decentralized manner. Thus, even though the data broadcast service 440 may be owned by a business entity or the like, because the data broadcast service 440 is part of the decentralized network backed by the distributed ledger or blockchain 220, it is unable to ascertain any identification information about the DID owner 201 and the users 410, 420, 430, and 405 without those users granting permission to the data broadcast service 440. Accordingly, the DID owner 201 and the users 410, 420, 430, and 405 maintain control over their respective identities in relation to the data broadcast service 440.

The data broadcast service 440 may include an aggregation module 450. In operation, the aggregation module 450 may receive various data from the DID owner 201 and the users 410, 420, 430, and 405. It will be noted that in many instances, the number of users 405 will be very large, potentially in the millions of users. In addition, the various users 405 may be spread across a large geographic area, for example an entire country or even the world. Accordingly, the aggregation module 450 may receive a large amount of data.

As noted above, the DID owner 201 and the users 410, 420, 430, and 405 maintain control over their respective identities in relation to the data broadcast service 440. Accordingly, the DID owner 201 and the users 410, 420, 430, and 405 are able to control which of the data 401, 412, 422, and 432 respectively is provided to the data broadcast service 440. In other words, unlike centralized systems where data similar to the data 401, 412, 422, and 432 would be "pulled" from the DID owner 201 and the users 410, 420, 430, and 405, in current embodiment the DID owner 201 and the users 410, 420, 430, and 405 determine which data to provide or "push" to the data broadcast service 440. In this way, the DID owner 201 and the users 410, 420, 430, and 405 maintain complete control over the data that may be or may not be provided to the data broadcast service 440.

For example, as shown in FIG. 4 the DID owner 201 may provide or push to the aggregation module 450 attestation 341, attribute 321a, telemetry data 401a, and any number of additional portions of the data 401 as illustrated by the ellipses 451. The user 410 may provide or push to the aggregation module 450 attestation 413a, attribute 414a, telemetry data 415a, and any number of additional portions of the data 412 as illustrated by the ellipses 452. The user 420 may provide or push to the aggregation module 450 attestation 423a, attribute 424a, telemetry data 425a, and any number of additional portions of the data 422 as illustrated by the ellipses 453. The user 430 may provide or push to the aggregation module 450 attestation 433a, attribute 434a, telemetry data 435a, and any number of additional portions of the data 432 as illustrated by the ellipses 454. It will be noted that the DID owner 201 and the users 410, 420, and 430 may provide all of their respective data 401, 412, 422, and 432 to the aggregation module 450, any subset of this data, or none of the data as circumstances warrant since they control what data is provided.

As shown in FIG. 4, the aggregation module 450 may aggregate the provided data according to which DID it was provided by. That is, since the only identification that the data broadcast service 440 knows is the DID of the users, this identification is used when aggregating the provided data. This is shown in FIG. 4.

The data broadcast service 440 may also include an analysis module 460. In operation the analysis module 460 may analyze the data aggregated by the aggregation module 450 to determine various patterns that may be found in the data. These patterns, which may include a pattern 461, a pattern 462, and any number of additional patterns 463. The patterns 461, 462, and 463 may provide inferences about common characteristics or traits between the DID owner 201 and the users 410, 420, and 430 as will be explained in more detail to follow.

The data broadcast service 440 may include a broadcast unit or module 470. The broadcast unit represents the physical elements and software elements that may be associated with the data broadcast service 440 to broadcast data. In operation the broadcast unit 470 may broadcast data related to the patterns found by the analysis module 460 to one or more of the DID owner 201 and the users 410, 420, 430, and 405. The broadcast data may then be used by the one or more of the DID owner 201 and the users 410, 420, and 430 in various ways as will be explained. The operation of the aggregation module 450, the analysis module 460 and the broadcast unit 470 will now be explained.

For example, suppose that the DID owner 201 is a lawyer who practiced law in Seattle, the user 410 is a lawyer practicing law in Portland and the user 420 is a lawyer practicing law in Redmond. Further suppose that the DID owner 201, the user 410, and the user 403 like to fish and that each one of them frequents one or more websites that deal with various locations for fishing trips. The DID owner 201 and the users 410 and 420 may provide to the aggregation module 450 an attestation (i.e., 341, 413a, and 423a) that attests that they are lawyers, attribute data (i.e., 321a, 414a, and 423a) that lists them as liking to fish and as living in the Northwest of the United States, and telemetry data (i.e., 401a, 415a, and 425a) that shows that they frequent websites related to fishing trips. Of course, the DID owner 201 and the users 410 and 420 may provide additional data as needed to the aggregation module 250.

The analysis module 460 may then analyze the data received from the DID owner 201 and the users 410 and 420 (along with data received from numerous other users). Based on this analysis, the analysis module 460 may determine the following pattern 461: lawyers who live in the Northwest of the United States like to fish and are likely to go on a fishing trip for a vacation. It will be noted that the pattern infers common characteristics or traits about the DID owner 201 and the users 410 and 420. The common characteristics or traits are that they all are lawyers, live in the Northwest of the United States, like to fish, and are likely to take a fishing trip. Of course, the analysis module 460 may determine a similar pattern based on different data provided by the DID owner 201 and the users 410 and 420. For example, the data that is provided may only be telemetry data that shows frequent visits to fishing related websites, legal related websites, and websites based in the Northwest of the United States. Such data may allow the analysis module 460 to determine a pattern 462 that is similar to the pattern 461.

The analysis module may then determine all the DIDs that are associated with lawyers in the Northwest of the United States. The broadcast unit 470 may then broadcast data such as data 471 that includes the pattern 461 and includes the DIDs of lawyers in the Northwest of the United States. The broadcast data 471 may be broadcast to all users that are associated with the data broadcast service 440 or it may be broadcast to only a subset of the users as will be explained.

In the current example, suppose the user 430 is a business entity that runs fishing trips. The user 430 may receive the broadcast data 471 and since the business entity runs fishing trips it may be interested in the fact that lawyers in the Northwest may like to fish. Accordingly, the user 430 may use the DIDs that are provided in the data 471 to contact the DID owner 201, the users 410 and 420, and any number of additional lawyers in the Northwest of the United States using the distrusted ledger or blockchain 220 and their respective DID documents in the manner previously described to provide information 437 regarding the fishing trips run by the user 430. The DID owner 201 and the users 410 and 420 (and any other interested lawyers in the Northwest of the United States) may then engage in further communication with the user 430 to ultimately purchase a fishing trip or they may choose to ignore the information 437. It will be noted that FIG. 4 shows the information 437 being provided to the user 420 and received by the DID owner 201 and the user 410 for ease of illustration.

Advantageously, the embodiments disclosed herein allow the data broadcast service 440 to connect users who may be interested in conducting business transactions or other communication with each other without the need to disclose their identity to the other party or to the data broadcast service 440. In addition, the embodiments disclosed herein may connect parties that would otherwise not be likely to be connected to each other. For example, suppose that the user 430 runs the fishing trips in South Asia. It is possible that lawyers in the Northwest of the United States that like to fish would not be aware of the user 430's business in South Asia. However, the embodiments disclosed herein provide a way for the user 430 to find out that lawyers in the Northwest of the United States may like to fish and then to contact them so as to provide them with information about the fishing trips in South Asia. Accordingly, the embodiments disclosed herein provide expanded potential marketplaces for the various users associated with the data broadcast service 440.

Although the disclosed example dealt with the business of providing fishing trips or vacations, this is only one of numerous examples. Accordingly, the embodiments disclosed herein provide for any type of business, product, or service to be determined to be of interest to the one or more of the DID owner 201, and the users 410, 420, 430, and 405 based on the data aggregated by the data aggregation module 450. The various types of businesses, products, or services may then be broadcast to one or more interested users associated with the data broadcast service 440 in the manner described for the fishing trip example.

As may be appreciated, one or more of the DID owner 201 or the users 410 and 420 may receive the information 437 from the user 430 regarding the fishing trip and may wonder if the user 430 is reputable. This may be particularly true if the user 430 is an entity that the DID owner 201 or the users 410 and 420 have never heard of or done business with. Accordingly, the data broadcast service 440 may include a trust module 480. In operation, the trust module 480 may determine a trust score 481 for various user associated with the broadcast service 440. The trust score may be based, in one embodiment, on a determination of how often various users accept communication with another user.

For example, suppose that the user 430 has been providing fishing trips for many years and has provided information 437 about its fishing trips to many users associated with the data broadcast service 440. In such instance, the score module 480 may determine how often one of users such as the DID owner 201 and the users 410 and 420 accepted the communication with the user 430. If a certain percentage did accept communication, perhaps measured based on a threshold, then a relatively high trust score 481 may be generated. Conversely, if only a small percentage of the users accepted communication or if perhaps the user 430 was a newer business, then a relatively low trust score 482 may be generated.

In response to receiving the data 437, one or more of the DID owner 201 or the users 410 and 420 may access the trust score 481 from data broadcast service 440. The DID owner 201 or the users 410 and 420 may then make a determination about whether to communicate with the user 430 or not based on the trust score 481. Advantageously, the use of the trust score 481 helps to provide confidence to the various users associated with the data broadcast service 440 in their interactions with each other.

The broadcast data service 440 may also include a subscription module 490. In operation, the subscription module 490 allows a user such as user 430 to subscribe to broadcasts of data 471 that it is interested in. For example, in the example where the user 430 is the business entity that provides fishing trips, the user 430 may subscribe to only receive data 471 that is related to users who may be interested in fishing trips. In this way, the user 430 does not receive broadcasts of data 471 including patterns 461 and DIDs of users that may not be related to fishing trips. Thus, the subscription module 490 allows the user 430 to receive more focused data.

The subscription module 490 may also be used by the DID owner 201 and the users 410 and 420. For example, as previously described the aggregation module 450 and the analysis module 460 may determine many patterns based on the data provided, for instance the pattern 461 based on lawyers in the Northwest who like fishing trips and a pattern 462 based on a subject matter not related to fishing. In such instances, the DID owner 201 and the users 410 and 420 may use the subscription module 490 to choose which patterns should be used when data is provided to them. This prevents all possible patterns being used when determining what data is provided and thus allows the DID owner 201 and the users 410 and 420 to only get data from third parties that they want. Of course, the DID owner 201 and the users 410 and 420 (and the users 430 and 405) can control which data is determined by the data broadcast service 440 to be provided to them based on which data they provide to the data broadcast service 440. However, the subscription service 490 provides an additional way to filter out unwanted data from third parties such as the user 430.

The data broadcast service 440 may also include an advertising module 495. In operation, the advertising module 495 may allow any user associated with the data broadcast service 440 to generate an advertisement 496 related to a service, a product, or the like. This advantageously helps to ensure that a specific user is at the least included in any broadcast of the data 471 that is related to the advertisement 496.

For example, suppose the DID owner 201 was a patent lawyer. In such case, he or she may have the advertising module 495 generate an advertisement 496 that may associate the DID 205 with being a patent attorney. At a later time when the data broadcast service 440 determines in the manner previously described that the user 420 may be interested in hiring a patent attorney, the data broadcast service 440 will ensure that the data 471 that includes the DID 421 of the user 420 is provided to the DID owner 201. The DID owner 201 may then use the DID 421 to contact the user to offer patent law services.

In another embodiment, a user such as the user 410 may have a car and may be willing to ride share for a fee. Accordingly, the user 410 may generate an advertisement 496 that includes an attestation 413a from a government agency that attests that he or she has a valid driver license, an attestation 413b that attests that he or she has a working vehicle, an attribute 414a that specifies a time of availability and possibly a fee schedule, and the DID 411 of the user 410. At a later time when the data broadcast service 440 determines in the manner previously described that the user 420 is looking to pay for a ride share, the data broadcast service 440 will ensure that the data 471 that includes the DID 421 of the user 420 is provided to user 410. The user 410 may then use the DID 421 to contact the user 420 to offer a ride share.

Similarly, the user 410 may have an apartment, house, or room they wish to rent out to another user. Accordingly, the user 410 may generate an advertisement 496 that includes an attestation 413a from a government agency that attests that he or she owns the house, apartment, or room for rent, an attribute 414a that specifies a time of availability and possibly a fee schedule, and the DID 411 of the user 410. At a later time when the data broadcast service 440 determines in the manner previously described that the user 420 is looking to pay for a ride share, the data broadcast service 440 will ensure that the data 471 that includes the DID 421 of the user 420 is provided to user 410. The user 410 may then use the DID 421 to contact the user 420 to offer the house, apartment, or room for rent.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
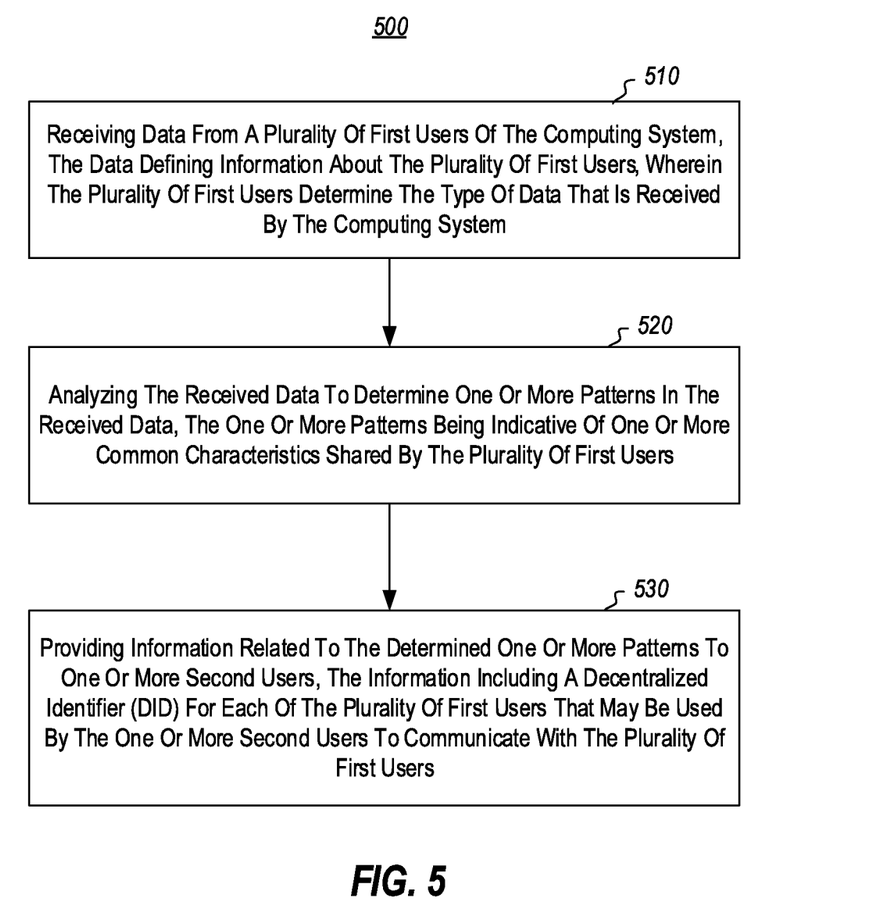
FIG. 5 illustrates a flow chart of an example method for determining patterns in received data that are indicative of common characteristics of the one or more users of a computing system.

FIG. 5 illustrates a flow chart of an example method 500 for determining patterns in received data that are indicative of common characteristics of the one or more users of a computing system. The method may be implemented in a computing system that is implemented in a decentralized network that implements a distributed ledger, the distributed ledger being configured to back one or more decentralized identities (DID) for one or more users of the computing system. The method 500 will be described with respect to one or more of FIGS. 2-4 discussed previously.

The method 500 includes receiving data from a plurality of first users of the computing system that defines information about the plurality of first users (510). The plurality of first users determine the type of data that is received by the computing system. For example as previously described, the data broadcast service 440 may receive data from the DID owner 201, the user 410, and the user 420. The data received from the DID owner 201 may include aggregation data 341, attribute data 321a, and telemetry data 401a. The data received from the user 410 may include aggregation data 413a, attribute data 414a, and telemetry data 415a. The data received from the user 420 may include aggregation data 423a, attribute data 424a, and telemetry data 425a. As previously described, the DID owner 201, the user 410, and the user 420 determine which data is provided to the data broadcast system 440 since they are in control of their identities through control of their respective DIDs.

The method 500 includes analyzing the received data to determine one or more patterns in the received data (520). The one or more patterns are indicative of one or more common characteristics shared by the plurality of first users. For example as previously described, the analysis module 460 may analyze the data aggregated by the aggregation module 450 to determine one or more patterns 461 and 462 based on the data. The patterns 461 and 462 may be based on common characteristics or traits between the users of the data broadcast system 440. For instance, the common characteristics or traits may include lawyers who live in the Northwest of the United States like to fish and are likely to go on a fishing trip for a vacation.

The method 500 may include providing information related to the determined one or more patterns to one or more second users (530). The information includes a DID for each of the plurality of first users that may be used by the one or more second users to communicate with the plurality of first users. For example as previously described, the broadcast unit 470 may provide the data or information 471 that includes the patterns 461 and the DIDs 205, 411, and 421 of the DID owner 201 and the users 410 and 420 respectively to the user 430, who is an example of a second user. The user 430 may then use the DIDs 205, 411, and 421 to contact one or more of the DID owner 201 and the users 410 and 420.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that is implemented in a decentralized network that implements a distributed ledger, the distributed ledger being configured to back one or more decentralized identities (DID) for one or more users of the computing system, wherein a DID is a unique string of numbers or letters associated with a DID owner, the computing system comprising:

one or more processors; and
one or more computer-readable media having thereon computer-executable instructions that are structured such that, when executed by the one or more processors, cause the computing system to:
receive permission from a plurality of first users of the computing system to access data owned by the plurality of first users via the decentralized network, each of the plurality of first users being an owner of a decentralized identifier;
accessing the data of the plurality of first users via the decentralized network using DIDs;
aggregate the data and analyze the aggregated data to determine one or more patterns in the received data, the one or more patterns being indicative of one or more common characteristics shared by at least one of the plurality of first users;
broadcast the DID(s) of the at least one of the plurality of first users and information related to the determined one or more patterns to one or more second users, each of the one or more second users being an owner of a DID, the broadcasting performed via the decentralized network using DIDs; and
cause the one or more second users to communicate with the at least one of the plurality of first users via the decentralized network using DIDs, the causing of the one or more second users to communicate with the at least one of the plurality of first users comprising:
for each of the one or more second users,
generating communication data associated with the DID of the corresponding second user and also associated with the one or more common characteristics shared by the at least one of the plurality of first users; and
sending the communication data to the at least one of the plurality of first users via a messaging module, wherein the messaging module allows the at least one of the plurality of first users to receive the communication data from the corresponding second user and allows the at least one of the plurality of first users to respond to the communication data associated with the corresponding second user.

2. The computing system of claim 1, wherein the computer-executable instructions that are structured to further cause the computing system to:
aggregate the received data prior to determining the one or more patterns, the received data being at least partially aggregated according to a DID of the one of the plurality of users who provided the received data.

3. The computing system of claim 1, wherein the information that is provided to the one or more second users is broadcast to all second users associated with the computing system.

4. The computing system of claim 1, wherein the information that is provided to the one or more second users is only sent to second users who have subscribed to receive the information.

5. The computing system of claim 1, wherein the computer-executable instructions that are structured to further cause the computing system to:
generate an advertisement based on data provided by one of the one or more second users, the advertisement helping to ensure that the information is provided to the one of the one or more second users who provided the data the advertisement is based on.

6. The computing system of claim 1, wherein the computer-executable instructions that are structured to further cause the computing system to:
generate a trust score for the one or more second users, the trust score based at least in part on how often the plurality of first users communicate with the one or more second users.

7. The computing system of claim 1, wherein the data received from the plurality of first users is one or more of attestation data, attribute data, and telemetry data.

8. In a computing system that is implemented in a decentralized network that implements a distributed ledger, the distributed ledger being configured to back one or more decentralized identities (DID) for one or more users of the computing system, wherein a DID is a unique string of numbers or letters associated with a DID owner, a method for determining patterns in received data that are indicative of common characteristics of the one or more users of a computing system, the method comprising:
receiving permission from a plurality of first users of the computing system to access data owned by the plurality of first users via the decentralized network, each of the plurality of first users being an owner of a decentralized identifier;
accessing the data of the plurality of first users via the decentralized network using DIDs;
aggregating the data and analyzing the aggregated data to determine one or more patterns in the received data, the one or more patterns being indicative of one or more common characteristics shared by at least one of the plurality of first users;
broadcasting the DID(s) of the at least one of the plurality of first users and information related to the determined one or more patterns to one or more second users, each of the one or more second users being an owner of a DID, the broadcasting performed via the decentralized network using DIDs; and
causing the one or more second users to communicate with the at least one of the plurality of first users via the decentralized network using DIDs, the causing of the one or more second users to communicate with the at least one of the plurality of first users comprising:
for each of the one or more second users,
generating communication data associated with the DID of the corresponding second user and also associated with the one or more common characteristics shared by the at least one of the plurality of first users; and
sending the communication data to the at least one of the plurality of first users via a messaging module, wherein the messaging module allows the at least one of the plurality of first users to receive the communication data from the corresponding second user and allows the at least one of the plurality of first users to respond to the communication data associated with the corresponding second user.

9. The method of claim 8, further comprising:
aggregating the received data prior to determining the one or more patterns, the received data being at least partially aggregated according to a DID of the one of the plurality of users who provided the received data.

10. The method of claim 8, wherein the information that is provided to the one or more second users is broadcast to all second users associated with the computing system.

11. The method of claim 8, wherein the information that is provided to the one or more second users is only sent to second users who have subscribed to receive the information.

12. The method of claim 8, further comprising:
generating an advertisement based on data provided by one of the one or more second users, the advertisement helping to ensure that the information is provided to the one of the one or more second users who provided the data the advertisement is based on.

13. The method of claim 8, further comprising:
generating a trust score for the one or more second users, the trust score based at least in part on how often the plurality of first users communicate with the one or more second users.

14. The method of claim 8, wherein the data received from the plurality of first users is one or more of attestation data, attribute data, and telemetry data.

15. A computer program product comprising one or more computer-readable hardware storage devices having stored thereon computer-executable instructions that are structured such that, when executed by one or more processors of a computing system, cause the computing system to perform the following:
receive permission from a plurality of first users of the computing system to access data owned by the plurality of first users via a decentralized network, each of the plurality of first users being an owner of a decentralized identifier (DID), each DID being a unique string of numbers or letters associated with a DID owner;
access the data of the plurality of first users via the decentralized network using DIDs;
aggregate the data and analyze the aggregated data to determine one or more patterns in the received data, the one or more patterns being indicative of one or more common characteristics shared by at least one of the plurality of first users; and
broadcast the DID(s) of the at least one first users and information related to the determined one or more patterns to one or more second users, each of the one or more second users being an owner of a DID, the broadcasting performed via the decentralized network using DIDs; and
cause the one or more second users to communicate with the at least one of the plurality of first users via the decentralized network using DIDs, the causing of the one or more second users to communicate with the at least one of the plurality of first users comprising:
for each of the one or more second users,
generating communication data associated with the DID of the corresponding second user and also associated with the one or more common characteristics shared by the at least one of the plurality of first users; and
sending the communication data to the at least one of the plurality of first users via a messaging module, wherein the messaging module allows the at least one of the plurality of first users to receive the communication data from the corresponding second user and allows the at least one of the plurality of first users to respond to the communication data associated with the corresponding second user.

16. The computer program product of claim 15, further comprising:
aggregating the received data prior to determining the one or more patterns, the received data being at least partially aggregated according to a DID of the one of the plurality of users who provided the received data.

17. The computer program product of claim 15, wherein the information that is provided to the one or more second users is broadcast to all second users associated with the computing system or is only sent to second users who have subscribed to receive the information.

18. The computer program product of claim 15, further comprising:
generating an advertisement based on data provided by one of the one or more second users, the advertisement helping to ensure that the information is provided to the one of the one or more second users who provided the data the advertisement is based on.

19. The computer program product of claim 15, further comprising:
generating a trust score for the one or more second users, the trust score based at least in part on how often the plurality of first users communicate with the one or more second users.

20. The computer program product of claim 15, wherein the data received from the plurality of first users is one or more of attestation data, attribute data, and telemetry data.

* * * * *